July 16, 1968

G. W. STRAYLINE 3,392,478

SAFETY GUARD FOR RODENT TRAP

Filed Oct. 24, 1965

INVENTOR
GEORGE W. STRAYLINE
BY
ATTORNEY

United States Patent Office 3,392,478
Patented July 16, 1968

3,392,478
SAFETY GUARD FOR RODENT TRAP
George W. Strayline, 1229 15th Ave. N.,
Lake Worth, Fla. 33460
Filed Oct. 24, 1965, Ser. No. 504,499
2 Claims. (Cl. 43—81.5)

ABSTRACT OF THE DISCLOSURE

A safety guard is pivotally mounted on one edge of the base of a swinging striker trap, the guard having a pair of spaced leg members terminating in hooked portions adapted to prevent the striker from swinging to trapping position, portions of the leg members cooperating with the one edge of the base to set the hooked portions in proper position over the striker.

---

The present invention relates to a safety guard and particularly relates to a safety guard which will enable setting of a trap without the likelihood of premature triggering of the spring driven trap element. It is among the objects of the present invention to provide a simple, inexpensive safety guard which will serve to prevent injury to the fingers or hand during the handling or setting of the trap.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In a preferable embodiment of the present invention the main U-shaped swinging spring driven trap element is provided with a holder member which latches on to the end thereto and permits safe handling and setting of the trap until it is placed in position in a runway or opening through which the rodent is expected to pass.

This swinging member is desirably pivotally mounted on the end of the trap or on the end of the baseboard carrying the trap elements and it may be readily removed after the trap is set.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views.

Figure 1:
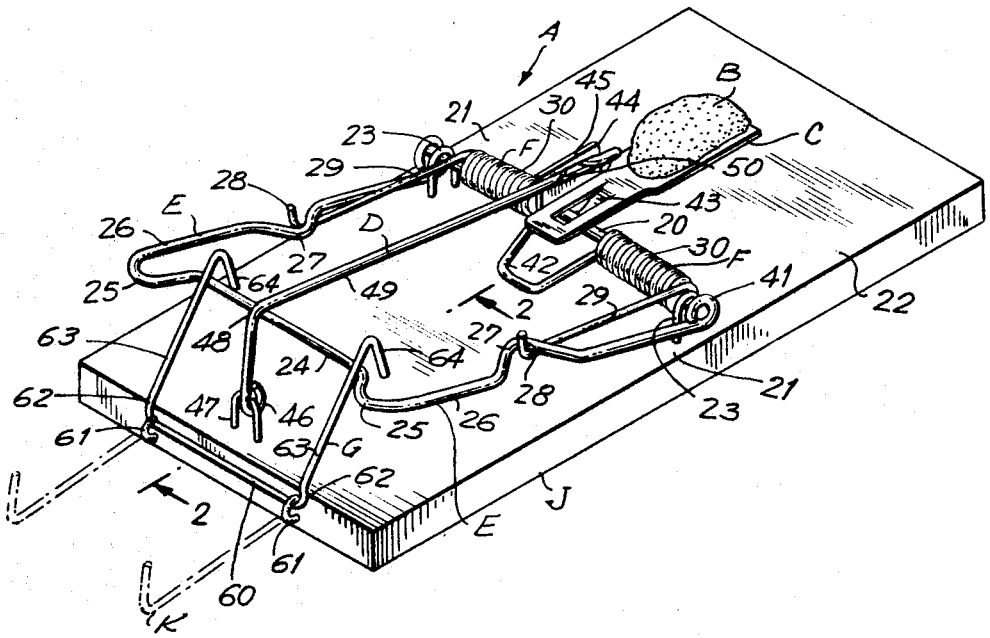
FIG. 1 is a top perspective view of the trap with the safety device in position.
Figure 2:
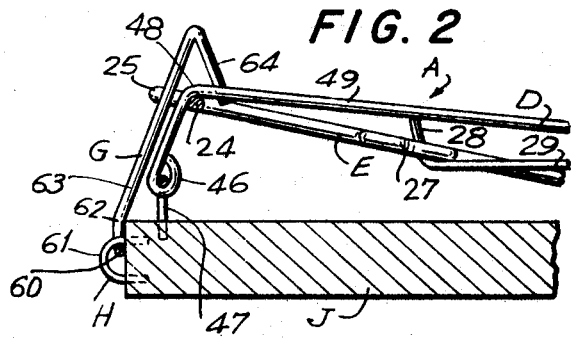
FIG. 2 is a fragmentary transverse vertical sectional view upon the line 2—2 of FIG. 1.
Figure 3:
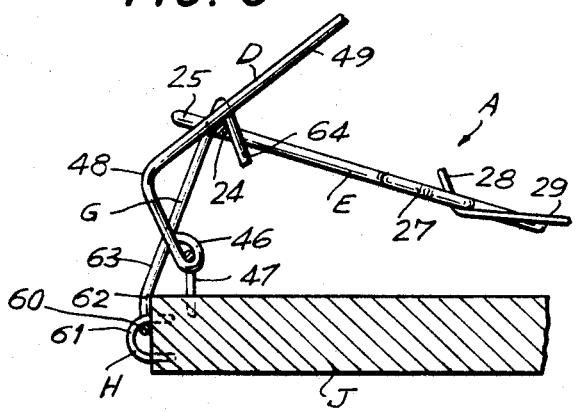
FIG. 3 is a transverse sectional view similar to FIG. 2 showing an accidental release with the safety guard in position protecting the hand of the handler.

Referring to FIGS. 1 to 3 there is shown a trap A with a bait B carried by pivotally mounted leaf C. The leaf C normally holds the release lever D so as to engage and hold down the main trap element E which is driven by strong coil springs F.

The present invention is particularly directed to the swinging safety guard element G which is pivotally mounted at H on the end of the baseboard J on the top of which the other elements are mounted.

Referring specifically to FIG. 1 the main cross bar or pivot member 20 is mounted at the sides 21 of the top 22 of the baseboard J by the inverted U shape pivot engagement elements 23. The main U shape bar which acts as the main trap element is provided with a top cross bar 24 having the corner projections 25 and the side legs 26. The side legs are bent inwardly as indicated at 27 to receive the upturned end element 28 of the driving arms 29 integrally connected to the very strong driving coil springs 30 which encircle the pivot rod 20.

The pivot rod has enlargements 40 at the end which hold in position the pivot eyes 41 of the side legs 26. The spring elements 30 are provided with a U member 42 which reacts against the top face 22 of the base J. The bait carrier is provided with a loop portion 43 which engages rod 20 and serves as a pivot mounting and it is also provided with an upstanding flange 44 which has a slot 45 to receive the normal trap holder D. The trap holder D has an end 46 mounted on the U shaped pivot 47. It is bent at 48 to extend over the cross member 24 and it has a long leg 49 with the outturned end portion 50 which engages in the slot to hold the trap in baited position when the safety catch is not in position.

The safety catch G has the base member 60 which is held by the loop 61 at the conjunction 62 with the leg 63. The ends of the legs have the hook members 64 which serve as the safety means to engage the cross bar. In handling the trap and in baiting it the hook members 64 are moved as in FIG. 2, so as to be over the cross bar 24 and prevent inadvertent release. When the hook members are swung to the dot and dash line position K of FIG. 1 the trap is ready to be operated by a rodent. Otherwise the hook members 64 are kept in position to prevent inadvertent release of the U member E.

Having now particularly described and ascertained the nature of the invention, and in what manner the same is to be performed, what is claimed is:

1. In a rodent trap of the type having a rectangular elongated base block having long side and short end walls, a main U-shaped trapping member having a clamp portion extending transversely across the block and positioned adjacent one of said short end walls of the block and parallel thereto when the trap is set, and a coil spring to swing said member from set position to trap position; a U-shaped safety member having an elongated pivoted cross bar positioned along the one of said short end walls and having a bent side leg extending from each end of said cross bar, each side leg terminating at its free end with a downwardly extending V-bent end portion to engage said clamp portion at spaced points, and the one of said short end walls acting as a stop for said safety member.

2. The trap of claim 1, in which the lower ends of said bent side legs being formed so as to be positioned directly against and contacting the one of said short ends walls when in operable position, and with the upper portions of the legs extending inwardly over the clamp portion and free of contact with said clamp portion when the same is in set position.

References Cited

UNITED STATES PATENTS

| | | | |
|---|---|---|---|
| 1,726,195 | 8/1929 | Seghers | 43—81.5 |
| 1,967,532 | 7/1934 | Jung | 43—81.5 |
| 2,506,898 | 5/1950 | Silvia | 43—81.5 |

WARNER H. CAMP, *Primary Examiner.*